No. 774,003.

Patented November 1, 1904.

UNITED STATES PATENT OFFICE.

EDWARD R. STOWELL, OF PORTLAND, INDIANA, ASSIGNOR TO ALVRED B. NETTLETON, OF CHICAGO, ILLINOIS.

FIREPROOF PAINT OR COATING.

SPECIFICATION forming part of Letters Patent No. 774,003, dated November 1, 1904.

Application filed May 31, 1904. Serial No. 210,354. (No specimens.)

*To all whom it may concern:*

Be it known that I, EDWARD R. STOWELL, a citizen of the United States, residing at Portland, in the county of Jay and State of Indiana, have invented certain new and useful Improvements in Compositions of Matter for Fireproof Paint or Coating, of which the following is a specification.

The object of the invention is to provide a fireproof paint or coating of a highly refractory nature for the protection of walls, bag-walls, flues, caps, crowns, fire-boxes, and other similar constructions, and all surfaces exposed to the action of fire or heat in brick, tile, building-tile, pottery, and lime kilns, coke-ovens, glass pots and tanks, cupolas, and other buildings or constructions intended to withstand a high degree of heat, also all surfaces and materials which it may be desirable to protect against heat or fire.

The paint of this invention is adapted to adhere to bricks, cement, stone, wood, iron, concrete, fabric, or plastered surfaces and is adapted to be sprayed thereon or applied with a brush in the same manner that paint of any ordinary character is applied, or articles may be immersed or dipped thereinto.

The fireproof paint of the present invention is preferably composed of equal parts of finely-powdered carbid of silicon and semiliquid water-glass and three to ten parts of calcium carbonate in each one hundred parts, according to the consistency desired. It is preferred to use soda water-glass, (silicate of sodium,) since its composition is efflorescent and enhances the drying properties of the paint, although potash water-glass (silicate of potassium) may be used under some circumstances.

When the carbid of silicon and silicate of sodium are mixed, gas is formed, which causes the paint to effervesce, which effervescence is overcome somewhat by the use of the calcium carbonate. This effervescence takes place shortly after the paint is mixed, but does not impair the effect of the paint if it is applied shortly after mixing. For this reason in cases where it is possible to apply a paint immediately after mixing it is not necessary to add the calcium carbonate, the object of which, as above stated, is to prevent effervescence.

For use the paint is prepared in the following manner: For a gallon of paint pour into a vessel one-half gallon of silicate-of-sodium fluid and then add in small quantities the carbid of silicon, stirring briskly until a thick paint results. Slight variations in these proportions will not destroy the quality of the paint. After mixing the two chemicals above specified the calcium carbonate may be added where it is desirable to prevent effervescence. Where the paint is applied as a protection to brick, tile, or pottery kilns, the ware placed and treated therein can be burned with less time and fuel.

It will be seen from the above description that the composition of the present invention is simple and inexpensive in formation and that it can be used under all circumstances in which it is desirable to render the parts impervious to heat.

What I claim as new, and desire to secure by Letters Patent, is—

1. A fireproof composition consisting of carbid of silicon and water-glass mixed together, substantially as described.

2. A fireproof composition consisting of carbid of silicon and silicate of sodium mixed together, substantially as described.

3. A fireproof composition consisting of substantially equal parts of carbid of silicon and silicate of sodium mixed together, substantially as described.

4. A fireproof composition, consisting of substantially equal parts of carbid of silicon and silicate of sodium with calcium carbonate added thereto, substantially as described.

5. A fireproof composition consisting of finely-powdered carbid of silicon, semiliquid silicate of sodium and from three to ten parts of calcium carbonate in one hundred parts of the composition, substantially as described.

6. A fireproof composition consisting of equal parts of finely-powdered carbid of silicon, and semiliquid silicate of sodium, and from three to ten parts of calcium carbonate in one hundred parts of the composition, substantially as described.

7. A fireproof composition consisting of carbid of silicon and water-glass with calcium carbonate added thereto, substantially as described.

8. A fireproof composition consisting of carbid of silicon and silicate of sodium with calcium carbonate added thereto, substantially as described.

EDWARD R. STOWELL.

Witnesses:
G. W. HAYNES,
GEO. W. HALL.

---

Refs.:—

Sc. American, Feb. 28, 1903, page 154, or
Electrical Rev., Mar. 14, 1903, p. 376;

Engels (British) 25,221, Sept. 17, 1903 (134-44).

See also Mueller, 770,730, Sept. 20, 1904 (134-45x).

---

I.  Carborundum      9
    Na silicate  }
    Water        }   1.

II. Carborundum     85
    Na silicate     10
    Fire clay        5

III. Carborundum    50-70 } for mortar.
     Fireclay       30-50 }

T. J. Tone, in "Foundry," Aug., 1904; reviewed in Rev. Am. Chem. Research, 10  481 (1904).